US007678406B2

(12) United States Patent
Heydtmann et al.

(10) Patent No.: US 7,678,406 B2

(45) Date of Patent: Mar. 16, 2010

(54) PUFFED PET FOOD FOR DIET CONTROL

(75) Inventors: Carla Patricia Heydtmann, Sagittaria (IT); Jagat Persaud, St. Joseph, MO (US); Avinash Patil, St. Joseph, MO (US); Clementine Jean-Philippe, Joinville-le-pont (FR)

(73) Assignee: Nestec S.A., Vevey (CH)

(*) Notice: Subject to any disclaimer, the term of this patent is extended or adjusted under 35 U.S.C. 154(b) by 886 days.

(21) Appl. No.: 10/548,417

(22) PCT Filed: Mar. 11, 2004

(86) PCT No.: PCT/US2004/007416

§ 371 (c)(1), (2), (4) Date: Sep. 8, 2005

(87) PCT Pub. No.: WO2004/080198

PCT Pub. Date: Sep. 23, 2004

(65) Prior Publication Data

US 2006/0240169 A1 Oct. 26, 2006

(51) Int. Cl.
*A23L 1/18* (2006.01)

(52) U.S. Cl. ........................ 426/625; 426/658; 426/805

(58) Field of Classification Search .................... 426/2, 426/658, 805, 625

See application file for complete search history.

(56) References Cited

U.S. PATENT DOCUMENTS 4,166,872 A * 9/1979 Karpik et al. ............... 242/159
4,190,679 A 2/1980 Coffee et al.
4,418,086 A * 11/1983 Marino et al. ............... 426/302
4,863,655 A * 9/1989 Lacourse et al. .............. 264/53
4,869,911 A * 9/1989 Keller ......................... 426/94
4,965,081 A * 10/1990 Lazarus ...................... 426/242
5,093,146 A * 3/1992 Calandro et al. ............ 426/619
5,262,190 A * 11/1993 Cunningham et al. ....... 426/549
5,422,132 A * 6/1995 Caden et al. ................ 426/555
6,103,283 A * 8/2000 Zukerman et al. ........... 426/285
6,203,825 B1 * 3/2001 Hodgkins ...................... 426/2
6,455,083 B1 * 9/2002 Wang .......................... 426/104
2001/0018067 A1 * 8/2001 Sunvold ...................... 424/442
2002/0146492 A1 * 10/2002 Bindzus et al. ............. 426/242
2005/0084599 A1 * 4/2005 Umeda et al. ............... 426/601

FOREIGN PATENT DOCUMENTS

| | | | | |
|---|---|---|---|---|
| EP | 0 465 364 | A1 | | 8/1992 |
| EP | 0 747 397 | A2 | | 11/1996 |
| EP | 1 226 762 | A2 | | 7/2002 |
| GB | 850705 | | | 5/1960 |
| GB | 1422345 | A | * | 1/1976 |
| JP | 11005802 | A | * | 1/1999 |

* cited by examiner

*Primary Examiner*—C. Sayala
(74) *Attorney, Agent, or Firm*—K&L Gates LLP

(57) ABSTRACT

Low energy-dense food products and methods of making low energy-dense food products are provided. Illustrative examples have a bulk density of less than 240 kg/m$^3$ (about 15 lb/ft$^3$) and comprise a high amylose starch and a starch comprising long chain amylose.

26 Claims, 1 Drawing Sheet

PUFFED PET FOOD FOR DIET CONTROL

FIELD OF THE INVENTION

The present invention relates generally to pet food products, and more specifically to a low energy-dense product that is nutritionally complete.

BACKGROUND OF THE INVENTION

The issue of weight management concerns many of the pet owners and veterinarians. Weight can be managed by controlling caloric intake and/or giving significant amount exercise to pets. Caloric intake can be controlled by feeding low calorie pet foods or feeding a smaller amount of regular calorie pet food. Low calorie pet foods achieve low energy density by having increased fiber levels and decreased fat levels in the diets, often resulting in a less palatable food. In addition, because of the high level of fiber in low calorie products, pets consuming this type of food product often produce larger amounts of feces. Also, because pets consume less of this product, owners often feel the need to compensate by feeding more treats to the pet. The treats provide additional calories, resulting in continued weight gain. Furthermore, while compliance with feeding instructions often results in the loss of body weight, there is a risk of losing lean body mass along with loss of body fat.

Another way to reduce the energy density of a food product is to puff the food product to create a less dense food product. Highly expanded puffed human snack foods are known. Such snacks typically have a bulk density of about 48 kg/m$^3$ (about 3 lb/ft$^3$) to about 64 kg/m$^3$ (about 4 lb/ft$^3$) and usually have a very high starch content, with carbohydrates comprising 70-80% by weight. Similarly, puffed breakfast cereals have a bulk density of about 48 kg/m$^3$ (about 3 lb/ft$^3$) to about 225 kg/m$^3$ (about 14 lb/ft$^3$) and also contain about 70-80% by weight carbohydrates, with an amylose to amylopectin ratio of about 25:75. Because of the high starch content, such compositions are not nutritionally complete.

Highly expanded snacks and breakfast cereals having densities of about 48 kg/m$^3$ (about 3 lb/ft$^3$) are generally made with pure starch or whole grain cereals and are coated with flavorings subsequent to puffing. Upon extrusion, pure starch can expand up to 5000% and whole grains (65-78% starch) can expand up to 400%. Pet food blends (40-50% starch) can expand only about 200-300% and oilseeds (0-10% starch) can expand only 150-200%. Animal meal, a main nutritional ingredient of animal meal, is high in protein and is an ingredient that is negative to expansion. Other nutritional ingredients are also negative or neutral to expansion. Thus, in general, more nutritionally complete mixtures have a lower maximum expansion than mixtures high in starch. Moreover, more nutritionally complete compositions that include a higher percentage of protein generally require more extreme extrusion conditions involving greater heat and/or pressure. Such conditions cause some of the starch to degrade. When the starch degrades, the resulting product either fails to puff or collapses upon exiting the extruder.

It has been found that a nutritionally complete mixture containing sufficient concentrations of high amylose starch can withstand the more extreme conditions used to extrude nutritionally complete compositions. Thus, a nutritionally complete composition can be made less dense by puffing the product as it is extruded.

SUMMARY OF THE INVENTION

A low energy-dense (puffed) product is provided that is nutritionally complete, palatable and satiates the pet. Additionally, because the pet eats a sufficient volume of food, the owner is more satisfied with the pet's eating behavior and is more likely to comply with feeding instructions. However, since the product is puffed, the animal receives fewer calories per unit volume food and the pet loses weight. Furthermore, since the puffed product can be formulated with a high percentage of calories coming from protein (illustratively at least 40% of metabolizable energy), the product will help obese pets lose body fat while minimizing the risk of losing lean body mass.

In one embodiment, a nutritionally complete pet food product is provided having a bulk density of less than about 240 kg/m$^3$ (about 15 lb/ft$^3$).

In another embodiment, a low energy-dense pet food product is provided. The low energy-dense pet food comprises a high amylose starch and a long chain amylose. Illustratively, the pet food product comprises high amylose corn starch, tapioca, and maltodextrin.

In yet another embodiment, a method of making a nutritionally complete low energy-dense pet food product is provided. The method comprises the steps of combining a carbohydrate source, a protein source, vitamins, and minerals to form a mixture, wherein the carbohydrate source comprises a high amylose containing starch, and extruding the mixture to form a product having a bulk density of less than about 240 kg/m$^3$ (about 15 lb/ft$^3$) and illustratively less than about 192 kg/m$^3$ (about 12 lb/ft$^3$).

It is understood that, while the examples relate to pet food products, the present disclosure is not limited to pet foods. Human foods may be formulated according to the present disclosure.

Additional features of the present invention will become apparent to those skilled in the art upon consideration of the following detailed description of preferred embodiments exemplifying the best mode of carrying out the invention as presently perceived.

DETAILED DESCRIPTION

Figure 1:
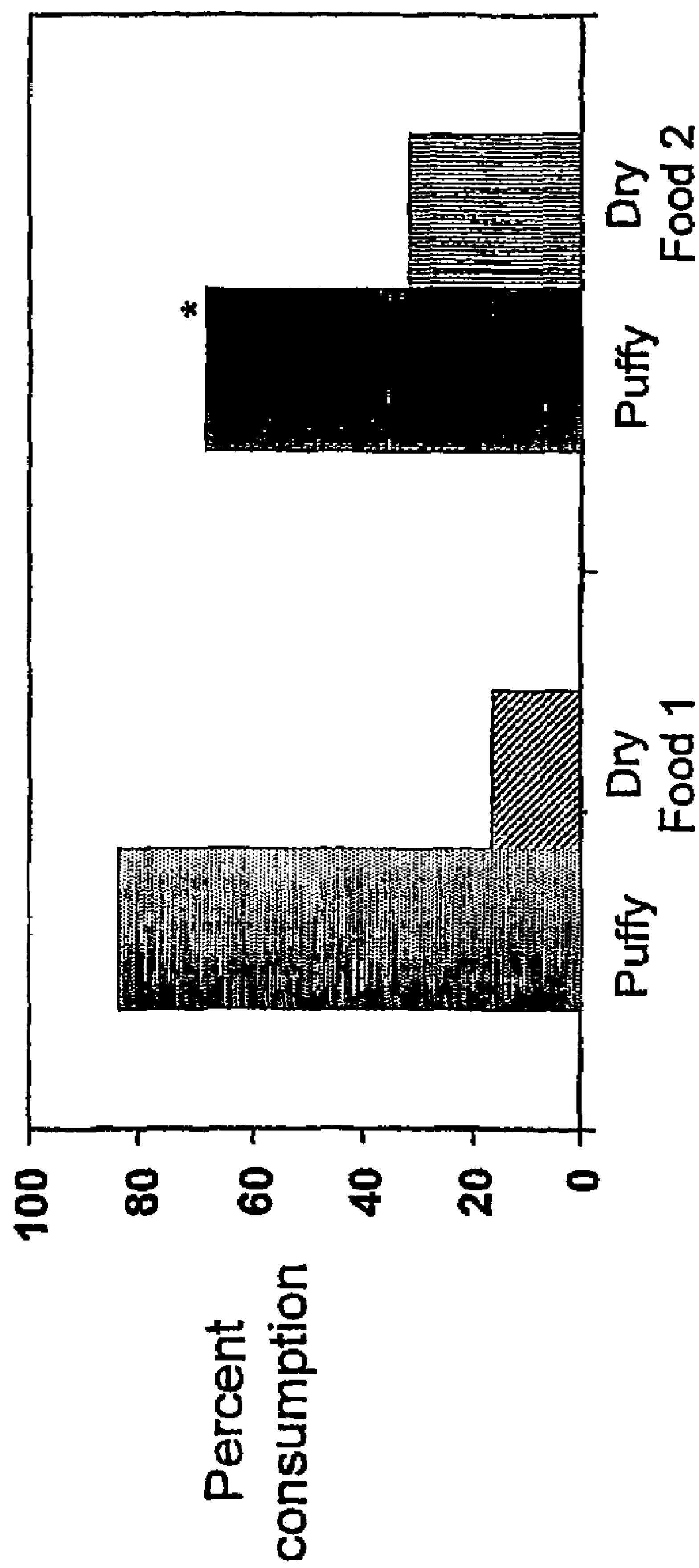
FIG. 1 shows the results of a dog palatability study of a puffed product of the present disclosure verses two popular brands of regular dry pet food.

A puffed product is provided that has a reduced number of calories per unit volume of food. The puffed product may be used as a weight management food for pets, either as the standard food or as a low calorie snack. Illustratively, the puffed product is palatable, has a low bulk energy density, and can induce rapid satiety. With the puffed product, pet owners can easily restrict caloric intake without limiting the volume of food given to pets. In one embodiment, the puffed product is given as a stand-alone food. In another embodiment, the puffed product is mixed with standard pet food.

Standard pet foods have a bulk density in the range of about 260-440 kg/m$^3$ (about 16-28 lbs/ft$^3$). The puffed product achieves its low energy density by using a composition including a high amylose starch. With puffed products according to the present compositions, the protein content may be raised and the puffed product retains its shape without collapsing significantly upon exiting the extruder die. The resulting puffed product illustratively has sufficient protein content to render the product nutritionally complete by acceptable standards, and has a bulk density about 240 kg/$m^3$ (about 15 lb/$ft^3$) or less; for example about 64 kg/$m^3$ (about 4 lb/$ft^3$) to about 240 kg/$m^3$ (about 15 lb/$ft^3$), and, in some embodiments, the pieces have a bulk density of about 64 kg/$m^3$ (about 4 lb/$ft^3$) to about 192 kg/$m^3$ (about 12 lb/$ft^3$), about 96 kg/$m^3$ (about 6 lb/$ft^3$) to about 175 kg/$m^3$ (about 11 lb/$ft^3$), or about 144-192 kg/$m^3$ (about 9-12 lb/$ft^3$). The puffed product may have a crunchy texture, similar to some human puffed foods. Because the puffed product achieves its low bulk energy density by puffing, rather than by increasing fiber levels, protein levels may remain high, and a nutritionally complete food (meeting AAFCO or Food and Nutrition Board Recommended Dietary Allowance (RDA) requirements) may be achieved.

Behavior data with a puffed product of the present disclosure shows that pets chew the puffed product longer than a comparable standard pet food, and the residence time for this product in the mouth is longer than the standard product. Therefore, the puffed products of the present disclosure are well suited to deliver chemical agents (e.g. TSPP etc.) that provide dental health benefits. Longer chewing may provide other health benefits as well, such as inducing a flatter glycemic response and increased secretion of enzymes.

The puffed products of the present invention are also suitable for diabetes management. The puffed product is digested and absorbed at a slower rate than the standard product in the gastrointestinal tract. Therefore, it is expected that the glucose and insulin response will be flatter after consumption of puffed product. This is highly desirable for diabetes management.

Weight problems, dental problems, and diabetes are three problems that are likely to co-exist in the same pet population. Therefore, in one embodiment, the puffed product ban be used to address all three issues simultaneously.

In addition to being low energy-dense, it has been found that the puffed products of the present disclosure can induce satiety more rapidly than with standard pet food. While the exact mechanisms are not fully understood, it is believed that the puffed product induces satiety by three possible mechanisms:

(a) The puffed product may cause a change in viscosity in stomach. Based on the nutrient composition and physical nature of the puffed product, it is possible that the puffed product will induce an increase in viscosity of the contents of the stomach, thereby delaying transit time of food from stomach. This can impart a feeling of fullness, leading to consumption of fewer calories.

(b) The physical nature of puffed product can impart feeling of thirst, thereby pets consume more water leading to stomach fullness.

(c) The puffed product is high in protein and high intake of protein has been shown to induce satiety in humans and other animal species. If desired, the induction of satiety could be increased or decreased by modifying the source of protein and amino acid composition of protein.

Additionally, in certain embodiments the puffed product soaks easily in water, milk, or other liquid to produce a porridge. Because the puffed product is nutritionally complete, embodiments of the puffed product are well suited for use as a weaning food.

The dried pet product is produced primarily from a carbohydrate source and a protein source. Other ingredients, illustratively vitamins, minerals, and fats, are added to produce a nutritionally complete food. The puffed dried pet food has a reduced bulk density as compared to standard pet foods, illustratively 4-15 lbs/$ft^3$ (64-240 kg/$m^3$). Because of the lower bulk density, a pet owner can restrict the pet's caloric intake without reducing the volume of food given to the pet.

The carbohydrate source may include grains such as corn, rice, wheat, barley, oats, or soy, and mixtures of these grains. The grain is conveniently provided in the form of a flour or meal. Pure or substantially pure starches may also be used if desired. Alternatively, it is understood that the carbohydrate source may contain other components, such as protein. The exact carbohydrate source or sources used is not critical. However, it has been found that a carbohydrate source having a high amylose content results in a puffed product that does not collapse significantly upon exiting the extruder dye. For the purposes of this disclosure, a high amylose content starch has an amylose to amylopectin ratio of at least 40:60, and more preferably about 50:50. It has also been found that the addition of a starch having particularly long amylose chains aids in the extrusion process and results in an extruded product having a more smooth, clearly defined shape. For purposes of this disclosure, long chain amylose is at least 2500 glucose units, illustratively 2500-3500 glucose units. The long chain amylose illustratively can be tapioca. The dried pet food illustratively contains about 40% to about 50% by weight of carbohydrate and the carbohydrate contains about 10-15% amylose. It has been found that in certain embodiments maltodextrin also aids in the extrusion process.

The protein source may be a vegetable protein source, animal protein source, or a mixture of these protein sources. Suitable vegetable protein sources include gluten, wheat protein, soy protein, rice protein, corn protein, and the like. These proteins may be provided in the form of flours, concentrates, and isolates as desired. Suitable animal protein sources are muscular or skeletal meat of mammals, poultry, and fish; meals such as meat meal, bone meal, fish meal, and poultry meal; by-products such as hearts, liver, kidneys, tongue and the like; and milk proteins. Illustratively, the protein source is a mixture of rendered animal and vegetable meals. The dried pet food conveniently contains about 25% to about 35% by weight of protein.

Illustrative food products may comprise 15 to 50% cereal grains, 1 to 30% high amylose cereal starch, 5 to 30% pregelled starches having long chain amylose (illustratively tapioca), and 25 to 40% protein (illustratively vegetable or animal protein meals).

In some embodiments, a fat may be sprayed on as a coating. The fat may comprise 1-25% of the weight of the puffed base. Illustratively, tallow equaling 5-15% of the weight of the puffed base may be used.

Various functional ingredients may be included. The functional ingredients may include a vitamin, a mineral, conjugated linoleic acid, an antioxidant, a microorganism, illustratively a probiotic, a moiety such as a metabolite or a supernatant of culture of such microorganism, an extract from a plant that may contain any of the above, a dietary supplement, or combinations and mixtures of the above. Illustratively, the functional ingredient, or mixture thereof, is selected for its properties in a weight management diet.

If desired, abrasive agents may also be included. Suitable abrasive agents include ground oyster shells, titanium dioxide, and the like. Similarly, dental care agents may also be included if desired; for example pyrophosphate salts such as tetrasodium pyrophosphate may be included.

In a specific example of a suitable extrusion cooking process a dry feed mixture is prepared from a protein source, a carbohydrate source, vitamins, and minerals. The dry feed mixture is then fed into a preconditioner.

In the preconditioner, water or steam, or both, is mixed into the dry feed mixture. Further, liquid flavor components, such as flavor-digests or tallow, may be mixed into the dry feed mix in the preconditioner. Sufficient water, steam, or liquid flavor components is mixed into the feed mixture to raise the moisture content of the dry feed mixture to about 10% to about 20% by weight. If desired, the temperature of the dry feed mixture may be raised in the preconditioner to about 65° C. to about 95° C. A suitable preconditioner is described in U.S. Pat. No. 4,752,139.

The moistened feed leaving the preconditioner is then fed into an extruder. The extruder may be any suitable cooking extruder. Suitable extruders may be obtained from Wenger Manufacturing Inc, Clextral S A, Bühler A G, and the like. Illustratively, the extruder may be an extruder with high shear extrusion (SME 0.07 to 0.1), as used for expanded snack food. During passage through the extruder, the moistened feed passes through a cooking zone, in which it is subjected to mechanical shear and is heated to a barrel temperature of up to about 157° C., and a forming zone. The gauge pressure in the forming zone is about 2000 kPa to about 7000 kPa as desired. If desired, water or steam, or both, may be introduced into the cooking zone. Further, during passage through the extruder, the starch ingredients of the moistened feed are further gelatinized to provide a gelatinized matrix of starch, protein, and other nutritional components.

The gelatinized matrix leaving the extruder is forced through a die. Suitable dies may be obtained from Wenger Manufacturing (Sebetha, Kans.). These dies are treated to an RA (roughness average as measured by prophelometer) of less than 30 microninch. The thickness of the extrudate may be varied depending on the type of food. Generally, kibbles for dogs will be three or more times larger than kibbles for cats. The orifice may have any suitable cross-section.

Upon leaving the die, the extrudate is cut into pieces using blades. The blades are preferably arranged such that the resultant pieces will be sized suitably for the animal to be fed with the product. The individual pieces may then be processed as desired. For example they may be partially or fully dried and coated with further flavoring agents. The high porosity of the puffed product enables high liquid addition and high fat addition without vacuum. Thus, the flavor and nutritional content can be adjusted to suit a wide variety of nutritional needs. After cooling, the pieces may be packed into suitable packages.

After drying, the pieces preferably have a moisture content of less than about 10% by weight, for example about 2% to about 7% by weight, when leaving the drier. Further the pieces preferably have a bulk density of about 240 kg/m$^3$ (about 15 lb/ft$^3$) or less; for example about 64 kg/m$^3$ (about 4 lb/ft$^3$) to about 240 kg/m$^3$ (about 15 lb/ft$^3$), and, in some embodiments, the pieces have a bulk density of about 64 kg/m$^3$ (about 4 lb/ft$^3$) to about 192 kg/m$^3$ (about 12 lb/ft$^3$) or 96 kg/m$^3$ (about 6 lb/ft$^3$) to about 175 kg/m$^3$ (about 11 lb/ft$^3$).

Specific examples are now described for further illustration.

Example 1

Highly Expanded Dry Pet Food I

A dry mix is prepared from about 24% by weight of whole corn flour, about 20% by weight of corn gluten, about 10% by weight of rice flour, about 18% by weight of high amylose corn starch (amylose to amylopectin ratio of 50:50), about 5% by weight of maltodextrin, about 20% by weight of poultry meal, about 5% by weight of fish meal, and about 6% by weigh of various vitamins and minerals. The dry mix is fed into a preconditioner along with a flavor digest. The preconditioned mixture is then fed into an extruder. The preconditioner is operated at about 190° F. Steam is injected into the preconditioner at about 1.2 kg/minute and water at about 0.6 kg/minute.

The moistened feed leaving the preconditioner is then fed into an extruder. The screw configuration and screw speed are adjusted to 650 rpm, to provide an SME (specific mechanical energy—kWhr/kg) of 0.01-0.1, which is at the upper end of the extruder capabilities and is significantly more shear that is required with standard dry pet food. The pressure upon leaving the extruder is about 6894 kPa. However, it is known in the art that adjusting the pressure will adjust the density. For example, pressures of 6000 to 8000 kPa will produce suitable results, depending upon the application. Other pressures may be suitable as well.

The gelatinized mixture is forced through the orifice of a die. Illustratively, the orifice is in the shape of a fish in cross section having a total area of about 0.0279 mm$^2$. The extrudate leaving the die is cut into pieces of 6 to 20 mm in length. However, it is understood that the pieces may be of any suitable size and cross section shape. The pieces are then coated with flavoring agents and dried in the normal manner.

The resultant puffed product had a bulk density in the range of about 120-136 kg/m$^3$ (about 7.5-9.5 lb/ft$^3$), with a rough outer surface.

Example 2

Highly Expanded Dry Pet Food II

A dry mix is prepared from about 24% by weight of whole corn flour, about 20% by weight of corn gluten, about 5% by weight of high amylose corn starch (amylose to amylopectin ratio of 50:50), about 5% by weight of maltodextrin, about 10% by weight of tapioca, about 5% by weight of wheat starch, about 20% by weight of poultry meal, about 5% by weight of fish meal, and about 6% by weigh of various vitamins and minerals. The dry mix is fed into a preconditioner along with a flavor digest, as in Example 1. The moistened feed leaving the preconditioner is then extruded as in Example 1, except that the rpm was reduced to 550. Also, because some of the ingredients were pre-cooked, the temperature in the extruder barrel was reduced somewhat. The pieces are then coated with flavoring agents and dried in the normal manner. Illustrative flavoring agents include 5-15% tallow, 5-15% syrup, and 1-10% chicken digest. However, it is understood that other flavoring agents may be used to alter the palatability of the puffed product.

The resultant puffed product had a bulk density in the range of about 120-136 kg/m$^3$ (about 7.5-8.5 lb/ft$^3$), with a smooth, clearly defined shape.

Example 3

Animal Palatability Tests

Because of their unique ingredients and processing steps, the puffed products differ from the standard kibble in a number of different sensory and physical dimensions. For example, with the pet food formulation of Example 2, the product is crunchier than the standard pet food. A number of palatability trials were run to assess the palatability of puffed products (different coatings were assessed) for both dogs and cats.

Dogs significantly preferred the puffed product of Example 2 over two popular brands of regular dry pet food (FIG. 1). Overall food consumption was not compromised during the trials and no animals were flagged for low consumption.

In the cat preliminary trials, results from 23 paired trials using a puffed product according to Example 2 versus Friskies® Ocean Fish (FOF) showed parity for the puffed products and FOF, in terms of percent consumption. In later trials, when modifications were made to the product, significant preference was seen for the puffed product. However, the overall consumption on these trials tended to be lower than for trials with no puffed products. To increase consumption for cats, several approaches are possible. In one embodiment, the size of the kibble is reduced, wherein the cross-section area of the kibble is decreased by about two-thirds. It is expected that the cats will increase consumption with the reduced kibble size. In another embodiment, the bulk density of the puffed product is increased, illustratively to about 128-240 kg/m$^3$ (about 8-15 lb/ft$^3$), and more particularly about 144-192 kg/m$^3$ (about 9-12 lb/ft$^2$). In yet another embodiment, the puffed product is mixed with standard cat food. Illustratively, the standard cat food and puffed product are present in a ratio of 1:10 to 10:1.

Although the invention has been described in detail with reference to certain preferred embodiments, variations and modifications exist within the scope and spirit of the invention as described and defined in the following claims.

The invention claimed is:

1. A nutritionally complete food product having a bulk density of less than about 15 lb/ft$^3$, the food product comprising a carbohydrate source comprising 15 to 50% cereal starch, 5 to 30% pregelatinized starch having long chain amylose starch, and 1 to 30% of a high amylose starch having an amylose to amylopectin ratio of at least 40:60.

2. The food product of claim 1, formulated and sized as a pet food product.

3. The food product of claim 1 wherein the bulk density is about 4 lb/ft$^3$ to about 15 lb/ft$^3$.

4. The food product of claim 1 wherein the bulk density is about 4 lb/ft$^3$ to about 12 lb/ft$^3$.

5. The food product of claim 1 wherein the bulk density is about 6 lb/ft$^3$ to about 11 lb/ft$^3$.

6. The food product of claim 2 wherein the pet food product is a cat food and the bulk density is about 7.5-8.5 lb/ft$^3$.

7. The food product of claim 2 wherein the pet food product further comprises a standard cat food having a density of about 16-28 lbs/ft$^3$ intermixed with the food product, the standard cat food and food product being present in a ratio of 1:10 to 10:1.

8. The food product of claim 1 wherein the bulk density is about 9-12 lb/ft$^3$.

9. A low energy-dense food product comprising 15 to 50% of a cereal starch, 1 to 30% of a high amylose starch having an amylose to amylopectin ratio of at least 40:60, and 5 to 30% of a pregelatinized starch having long chain amylose.

10. The low energy-dense food product of claim 9 wherein the high amylose starch is high amylose corn starch, the starch comprising long chain amylose is tapioca, the food product further comprising maltodextrin.

11. The low energy-dense food product of claim 9 further comprising necessary ingredients to render the low energy-dense food product nutritionally complete.

12. The low energy-dense food product of claim 9 comprising a protein source and a fat.

13. The low energy-dense food product of claim 12 wherein the fat is sprayed on as a coating.

14. The low energy-dense food product of claim 9 comprising a functional ingredient.

15. The low energy-dense food product of claim 9 further comprising a chemical agent for providing dental health benefits.

16. The low energy-dense food product of claim 9 wherein the high amylose starch has an amylose to amylopectin ratio of at least 50:50.

17. The low energy-dense food product of claim 9 wherein a porridge is formed upon the addition of the food product to a liquid.

18. A method of managing the weight of a pet comprising the step of feeding the pet a low energy-dense food product comprising a low energy-dense food product comprising 15 to 50% of a cereal starch, 1 to 30% of a high amylose starch having an amylose to amylopectin ratio of at least 40:60, and 5 to 30% of a pregelatinized starch having long chain amylose.

19. The method of claim 18 wherein the low energy-dense food product is nutritionally complete.

20. The method of claim 19 wherein the low energy-dense food product comprises at least 90% of the nutrition provided to the pet.

21. The method of claim 20 further comprising the step of providing a standard pet food to the pet.

22. The method of claim 21 wherein the standard pet food is provided intermixed with the low energy-dense food product.

23. The method of claim 21 wherein the feeding step replaces a meal of the standard pet food product.

24. The method of claim 19 wherein the feeding step comprises substituting a volume of a standard pet food previously feed to the pet for a substantially equal volume of the low energy-dense food product, thereby reducing the pet's caloric intake.

25. The method of claim 18 wherein the feeding step includes feeding the low energy-dense food product as a snack.

26. A method of making a nutritionally complete low energy-dense food product comprising the steps of combining a carbohydrate source, a protein source, vitamins, and minerals to form a mixture, wherein the carbohydrate source comprises 15 to 50% of a cereal starch, 5 to 30% pregelatinized starch having long chain amylose, and 1 to 30% of a high amylose containing starch having an amylose to amylopectin ratio of at least 40:60, and extruding the mixture to form a product having a bulk density of less than about 15 lb/ft$^3$.

* * * * *